United States Patent [19]

Tanaka et al.

[11] Patent Number: 4,626,948

[45] Date of Patent: Dec. 2, 1986

[54] MAGNETIC TAPE CARTRIDGE PIVOT PIN AND SUPPORTING MEMBER

[75] Inventors: Kimio Tanaka; Haruo Shiba; Yoshiya Sakata, all of Saku, Japan

[73] Assignee: TDK Corporation, Tokyo, Japan

[21] Appl. No.: 644,255

[22] Filed: Aug. 27, 1984

[30] Foreign Application Priority Data

Sep. 8, 1983 [JP] Japan ............................ 58-138408[U]

[51] Int. Cl.⁴ ............................................ G11B 23/04
[52] U.S. Cl. .................................... 360/132; 242/198
[58] Field of Search ................ 360/132; 242/198, 199; 206/387

[56] References Cited

U.S. PATENT DOCUMENTS

| | | | |
|---|---|---|---|
| 4,422,599 | 12/1983 | Okamura et al. | 242/198 |
| 4,519,521 | 5/1985 | Yoshii | 360/132 |

FOREIGN PATENT DOCUMENTS

| | | | |
|---|---|---|---|
| 92666 | 11/1983 | European Pat. Off. | 206/387 |
| 125688 | 11/1984 | European Pat. Off. | 360/93 |
| 3003260 | 8/1981 | Fed. Rep. of Germany | 206/387 |
| 58-60475 | 4/1983 | Japan | 360/132 |
| 2101096 | 1/1983 | United Kingdom | 206/387 |
| 2112751 | 7/1983 | United Kingdom | 206/387 |

*Primary Examiner*—John H. Wolff
*Assistant Examiner*—Matthew J. Bussan
*Attorney, Agent, or Firm*—Oblon, Fisher, Spivak, McClelland & Maier

[57] ABSTRACT

A magnetic tape cartridge comprising upper and lower half casings and a lid placed in the front of said upper and lower half casings so as to be opened and closed, in which pivot pins of the lid are fitted into supporting openings formed in the upper half casing or the lower half casing and the dimension at the entrance of each of the supporting openings is smaller than the diameter of each of the pivot pins so that the pivot pins are forced to be snap-fitted into the supporting openings.

1 Claim, 7 Drawing Figures

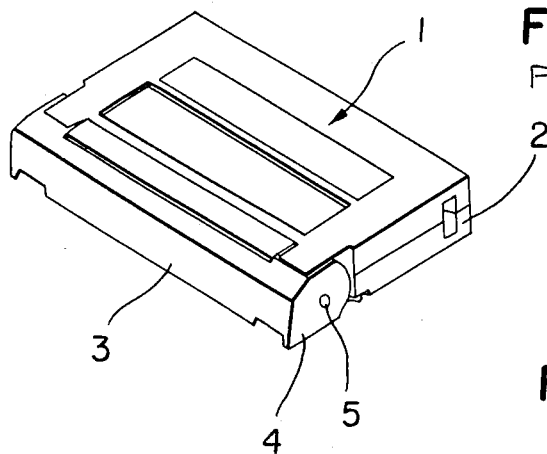
FIGURE 1
PRIOR ART
FIGURE 3
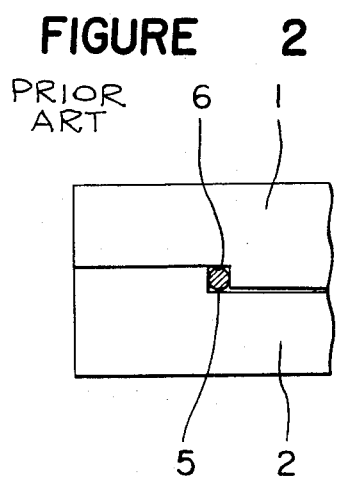
FIGURE 2
PRIOR ART
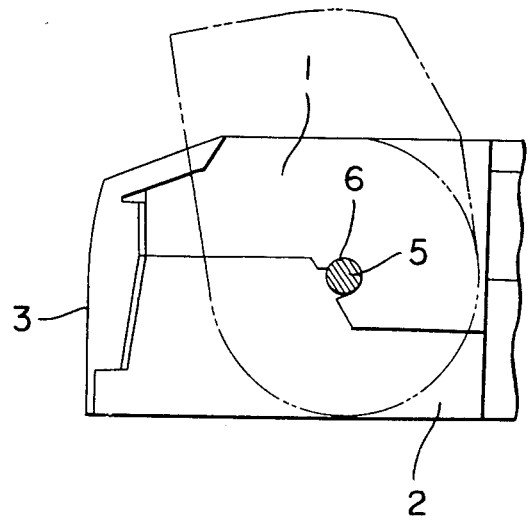
FIGURE 4
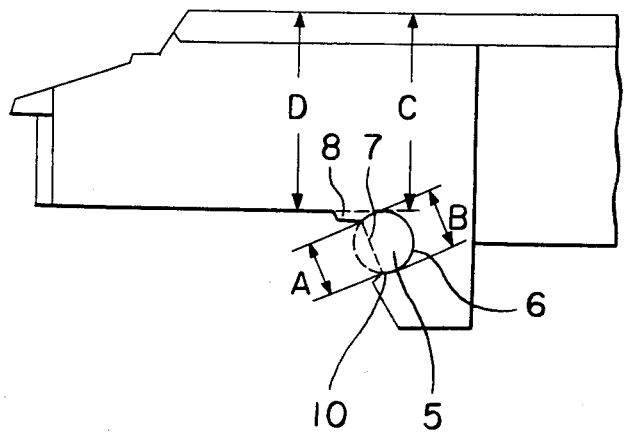

MAGNETIC TAPE CARTRIDGE PIVOT PIN AND SUPPORTING MEMBER

BACKGROUND OF THE INVENTION

1. Field of the Invention

The present invention relates to a magnetic tape cartridge used mainly for an 8 mm video tape recorder. More particularly, it relates to structure of a pivot pin as well as a supporting member thereof for a lid which is mounted on a pair of upper and lower casings and which is swingable between opening and closing positions.

2. Description of Prior Art

Magnetic tapes for video recorders have been widely used. The magnetic video tapes widespread at present are standardized as a half inch (12.65 mm) width type. However, it is estimated that demand for a small-sized video tape cartridge will increase in view of requirements in feasibility of handling and transporting. In response to such requirements, an 8 mm video tape has been developed. An 8 mm video tape cartridge should be, of course, reduced in size in comparison with a currently used video tape cartridge. However, only reduction in size of structural elements of an operating mechanism could not provide a satisfactory product and therefore, it is required to totally review the structural elements of the operating mechanism and their positional relationship. As the elements become smaller, it becomes difficult to assure reliability during operations of these elements and feasibility in assembling. When the construction having been conventionally used is utilized without change, trouble may be caused at the time of assembling and operations.

FIG. 1 shows the outer configuration of a typical 8 cm video tape cartridge, the dimension being 9.4 cm long, 6 cm wide and 1.5 cm thick. The cartridge comprises an upper half casing 1, a lower half casing 2 and a lid 3 mounted in the front of the casings so as to be opened and closed. The lid 3 is constructed in such a manner that when the video tape cartridge is placed on a video tape recorder, it is opened to expose a magnetic tape extending in the front portion inside the cartridge at the side of the rotating magnetic head and when the cartridge is removed from the video tape recorder, it automatically closed to protect the magnetic tape in the time of non-use. To allow the lid to be opened and closed, a pivot pin 5 is formed in the inner wall of each ear 4 formed at both sides of the lid 3 and each of the pivot pins 5 is supported by each of supporting openings provided by the upper and lower casings. Thus, the lid can be swung between an opened position and a closed position around the pivot pin 5. Specifically, as shown in FIG. 2, the pivot pin 5 is supported by fitting it in an opening 6 formed between the upper half casing 1 and the lower half casing 2. When the lid is to be assembled, the lid 3 is first mounted on the upper half casing 1 so that the pivot pin 5 comes to the shoulder portion of the upper half casing and then, the lower half casing 2 is coupled to the upper half casing so as to determine their positional relationship. In the assembling operations, therefore, the pivot pin 5 is apt to come out, on account of which an auxiliary supporting member is needed during the assembling operations. Accordingly, it is difficult to employ automatic operations for assemblage and the pivot pin may come out after completing of assemblage.

SUMMARY OF THE INVENTION

It is an object of the present invention to eliminate the disadvantage of the conventional magnetic tape cartridge and to provide a video tape cartridge for allowing easy and correct fitting of pivot pins of a lid to a casing.

It is another object of the present invention to provide a magnetic tape cartridge having a structure for supporting pivot pins of a lid in which the pivot pins are preliminarily fitted to an upper or lower half casing in assembling operations and once normally assembled, there is no risk of the pivot pins coming out from supporting openings.

The foregoing and the other objects of the present invention have been attained by providing a magnetic tape cartridge comprising upper and lower half casings and a lid placed in the front of the upper and lower half casings so as to be opened and closed, characterized in that pivot pins of the lid are fitted into recesses formed in the upper half casing or the lower half casing, the dimension at the entrance of each of the recesses being smaller than the diameter of each of the pivot pins so that the pivot pins are forced to be snap-fitted into the recesses. The recesses are then closed by the lower half casing so that annular support openings are formed in the complete casing.

BRIEF DESCRIPTION OF THE DRAWING

The foregoing objects, other objects as well as specific construction of the magnetic tape cartridge will be become apparent and understandable from the following detailed description thereof, when read in conjunction with the accompanying drawing.

In the drawing:

FIG. 1 is a perspective view showing the outer configuration of a typical video tape cartridge;

FIG. 2 is a side view of the front part of a conventional video tape cartridge showing supporting condition for a pivot pin of a lid;

FIG. 3 is a side view of an embodiment of the front part of the video tape cartridge according to the present invention showing a structure for supporting a pivot pin of the lid;

FIG. 4 is an enlarged side view of an upper half casing, as shown in FIG. 3, showing a recess for receiving a pivot pin; and FIGS. 5a through 5c are diagrams showing how a pivot pin is fitted into a recess, wherein FIG. 5a is a side view; FIG. 5b is a bottom view and FIG. 5c is a perspective view.

DETAILED DESCRIPTION OF PREFERRED EMBODIMENTS

Figure 5A:
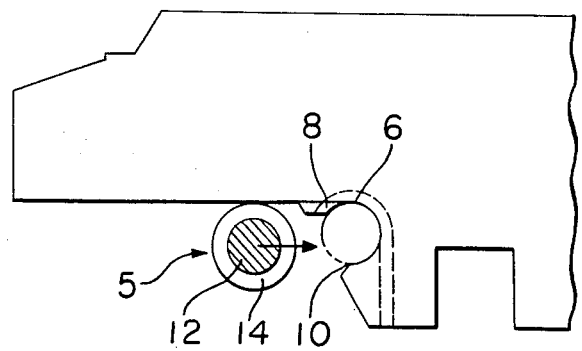

An embodiment of the present invention will be described with reference to the drawing.

FIG. 3 is a side view of an embodiment of the front part of the video tape cartridge according to the present invention. The same reference numerals as in FIGS. 1 and 2 designate the same or corresponding parts. In FIG. 3, the opening and closing lid 3 is mounted in the front of the upper and lower half casings 1, 2 so as to be swung between a horizontal closing position as indicated by a solid line and a vertical opening position as indicated by two dotted chain line, around the pivot pin 5 extending from the inner wall of each ear 4 of the lid 3, as similar to the conventional video tape cartridge.

In the embodiment of the present invention, the pivot pin 5 is snappingly fitted to the recess, also called supporting opening, 6 formed in the upper half casing 1 although the supporting opening 6 may be formed in the lower half casing 2. The supporting opening 6 is so made that once the pivot pin 5 is assembled to it, the pivot pin 5 can hardly come out the supporting opening 6. Namely, as shown in an enlarged view of FIG. 4, the supporting opening 6 has a dimension A at the entrance 7 of the opening 6 to the edge of the half casing, i.e., the first edge. The entrance is slightly smaller than the diameter B of the pivot pin 5. This may be done by providing the opening 6 as the major part of the circumference of a circle for which the entrance 7 forms a chord. When the lid 3 is mounted on the casings, the pivot pin 5 elastically expands the entrance of the supporting opening 6 to be fitted thereto. Thus, once the pivot pin 5 is fitted into the opening 6, there is no risk of coming out of the pivot pin 5. Under circumstances as above-mentioned, the lower half casing 2 is easily assembled to the upper half casing by a second edge thereof. A portion of the second edge which traverses the entrance 7 is shaped to mate with the entrance. Moreover, as seen in FIG. 3, the portion of the second edge is recessed as the minor part of the circumference of a circle to form, in combination with the opening 6, an annular opening for the pin 5.

To impart elastical expansion to the supporting opening 6, a bed-shaped rib 8 is formed contiguous to the upper edge of the entrance 7 of the opening 6 and a sharpened portion 10 is formed at the lower edge of the entrance to provide a boundary between the circular arc portion and a linear portion. The same elastical expansion effect can be obtained by reversing the positional relationship as above-mentioned, namely the sharpened portion 10 is formed at the upper edge of the entrance 7 and the bed-shaped rib 8 is formed at the lower edge. The upper and lower half casings are made of plastics and accordingly, when the pivot pin 5 of the lid 3 is forced into the opening 6, the bed-shaped rib 8 and the sharpened portion 10, both defining the entrance 7 of the opening 6 are somewhat deflected and returned to the original dimension after the pivot pin has been received in the supporting opening 6. It is preferable that the height D of a side wall extending toward the front surface is substantially the same as the height C extending from the highest point of the supporting opening receiving the pivot pin 5 to the upper surface of the upper half casing 1, to ensure that the upper and lower casings 1, 2 and the lid 3 are correctly assembled.

In accordance with this embodiment, it is not necessary to use an auxiliary supporting member during assembling operations since the pivot pin 5 can be temporarily retained in the opening 6 without causing droppage therefrom until the cartridge is assembled.

Figure 5B:
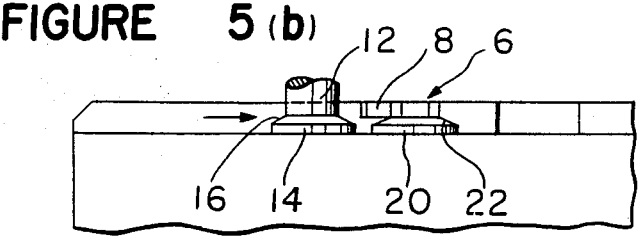
Figure 5C:
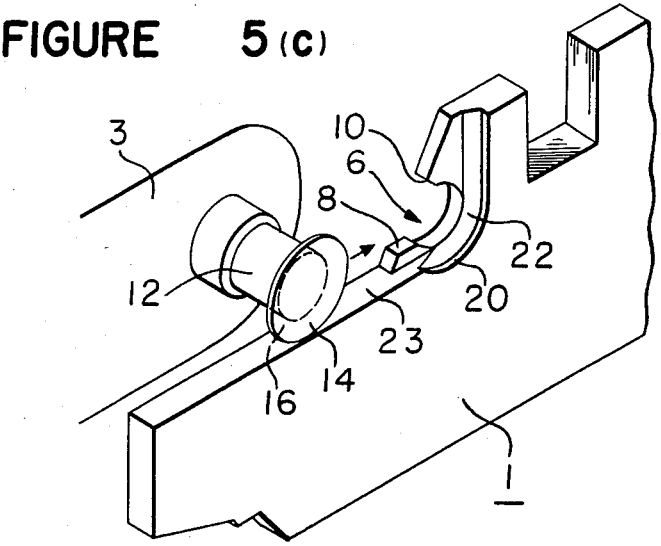

FIG. 5a shows a modified embodiment of the pivot pin 5 shown in FIG. 4 and shows that the pivot pin 5 is about to be fitted into the supporting opening 6. FIG. 5b is a bottom view of the state shown in FIG. 5a. The pivot pin 5 preferably comprises a cylindrical body portion 12, an enlarged portion 14 formed at the extreme end of the cylindrical body portion 12 (inside the cartridge) and a tapered portion 16 formed between the cylindrical body portion 12 and the enlarged portion 14. On the other hand, as clearly shown in FIGS. 5b and 5c, a groove 20 for receiving the enlarged portion 14 and a tapered groove 22 for receiving the tapered portion 16 are formed on the reverse side (inside) of the supporting opening 6. With the construction of the opening 6 as above-mentioned, the pivot pin 5 can not be easily removed from the opening 6 once it is fitted to the opening.

When the lid 3 is assembled to the upper half casing, the pivot pin 5 is guided on and along a guide surface 23 of the upper half casing and is forced into the supporting opening 6. The cylindrical body portion 12 of the pivot pin elastically expands the entrance of the opening to be fitted into the opening, while the tapered portion 16 and the enlarged portion 14 are respectively fitted into the tapered groove 22 and the groove 20. Once the pivot pin 5 having the enlarged portion and the tapered portion is fitted to the supporting opening, removal of the pivot pin is prevented and a stable pivotal movement of the lid 3 can be attained.

Thus, in accordance with the present invention, there is provided a supporting structure of a pivot pin of a lid to a casing which is excellent in assembling operation and stability in operation after its assemblage and reduces trouble such as coming out of the pivot pin.

What is claimed is:

1. A magnetic tape cartridge comprising:
   a first half casing having a first edge;
   a second half casing having a second edge which mates with said first edge to form a complete magnetic tape cartridge;
   first arcuate recesses in said first half casing at opposite sides thereof, each said first arcuate recess forming the major part of the circumference of a circle having a first diameter and intersecting said first edge to define an entrance of said first recess, said entrance extending along a chord of said circle and having a width dimension smaller than said first diameter; and
   a lid having pivot pins inserted in said first recesses, said pivot pins each having a diameter smaller than said first diameter and larger than said width dimension, whereby said pins are held in said first recesses by portions of each said first recess adjacent said entrance thereof;
   wherein portions of said second edge which traverse said entrances of said first recesses in said complete cartridge are shaped to mate with said entrances and each said portion of said second edge defines a second arcuate recess forming the minor part of said circle having said first diameter,
   whereby facing ones of said first and second receses cooperate to define continuous circular recesses, whereby said pins may be retained by said first recesses during assembly of said cartridge and whereby said second recesses help hold said pins in said continuous circular recesses of said complete cartridges and help center said casing halves.

* * * * *